United States Patent
Morrison

(10) Patent No.: US 7,194,685 B2
(45) Date of Patent: Mar. 20, 2007

(54) METHOD AND APPARATUS FOR TRACKING USAGE OF ONLINE HELP SYSTEMS

(75) Inventor: Michael C. Morrison, Ben Lomond, CA (US)

(73) Assignee: International Business Machines Corporation, Armonk, NY (US)

(*) Notice: Subject to any disclaimer, the term of this patent is extended or adjusted under 35 U.S.C. 154(b) by 286 days.

(21) Appl. No.: 09/928,601

(22) Filed: Aug. 13, 2001

(65) Prior Publication Data

US 2003/0030668 A1    Feb. 13, 2003

(51) Int. Cl.
*G06F 17/00* (2006.01)

(52) U.S. Cl. .................. 715/705; 715/712; 715/707; 715/745

(58) Field of Classification Search ............. 345/705, 345/765, 707–714, 744–747; 709/224, 229, 709/225; 707/104.1; 715/705–709, 745–747, 715/712, 704
See application file for complete search history.

(56) References Cited

U.S. PATENT DOCUMENTS

| | | | |
|---|---|---|---|
| 4,800,485 A | 1/1989 | Ackroff et al. ......... 707/104.1 |
| 4,964,077 A | 10/1990 | Eisen et al. .................. 345/707 |
| 5,103,498 A * | 4/1992 | Lanier et al. .................. 706/58 |
| 5,513,308 A | 4/1996 | Mori ........................... 345/707 |
| 5,535,323 A | 7/1996 | Miller et al. ................. 345/707 |
| 5,774,118 A * | 6/1998 | Hatakama ................... 345/707 |
| 5,819,156 A | 10/1998 | Belmont ...................... 725/125 |
| 5,933,140 A | 8/1999 | Strahorn et al. ............. 345/712 |
| 5,949,415 A | 9/1999 | Lin et al. ..................... 345/740 |
| 6,065,047 A * | 5/2000 | Carpenter et al. ........... 709/218 |
| 6,122,663 A | 9/2000 | Lin et al. ..................... 709/224 |
| 6,208,338 B1 * | 3/2001 | Fischer et al. .............. 345/705 |
| 6,307,544 B1 * | 10/2001 | Harding ....................... 345/709 |
| 6,434,619 B1 * | 8/2002 | Lim et al. .................... 709/229 |
| 6,490,624 B1 * | 12/2002 | Sampson et al. ........... 709/227 |
| 6,507,726 B1 * | 1/2003 | Atkinson et al. ........... 434/350 |
| 6,549,896 B1 * | 4/2003 | Candan et al. ................. 707/2 |
| 6,597,314 B1 * | 7/2003 | Beezer et al. ............... 715/712 |
| 6,691,159 B1 * | 2/2004 | Grewal et al. .............. 709/219 |
| 6,704,732 B1 * | 3/2004 | Barclay ....................... 707/10 |
| 6,760,844 B1 * | 7/2004 | McCarthy et al. .......... 713/201 |
| 6,985,953 B1 * | 1/2006 | Sandhu et al. .............. 709/229 |
| 2002/0035568 A1 * | 3/2002 | Benthin et al. ............. 707/102 |

(Continued)

OTHER PUBLICATIONS

IBM Technical Disclosure Bulletin, "Multimedia online Help Information Enabler," Mar. 1996.*

(Continued)

*Primary Examiner*—Tadesse Hailu
(74) *Attorney, Agent, or Firm*—Gates & Cooper LLP

(57) ABSTRACT

One or more embodiments of the invention provide a method, apparatus, and article of manufacture for presenting a help source. A help system is maintained that comprises a single set of one or more help source files. A request is received by the help system to present one or more of the help source files (or information from within one or more of the help source files). A help history file is obtained in response to the request, wherein the help history file stores information relating to a usage of the help system. A customized presentation of the help source file is then displayed based on the information stored in the help history file.

39 Claims, 7 Drawing Sheets

U.S. PATENT DOCUMENTS

2002/0047859 A1* 4/2002 Szlam et al. ................. 345/705
2002/0054123 A1* 5/2002 Walden et al. ............... 345/781
2002/0154155 A1* 10/2002 McKirchy ................... 345/705
2002/0174230 A1* 11/2002 Gudorf et al. .............. 709/227
2002/0196942 A1* 12/2002 Werner ....................... 380/258

OTHER PUBLICATIONS

Dieter Bungers, "Cross Browser Expanding and Collapsing Table of Contents Menu," Mar. 14, 2000.*

Luc Chamberland, Component ization of HTML-Based Online Help, pp. 165-168, 1999 ACM.*

Robin Green, Productivity Tools for Web-Based Information, pp. 219-226, 1998 ACM.*

Ben Gelernter, Help Design Challenges in Network Computing, pp. 184-193, 1998 ACM.*

Laura Rintjema and Kara Warburton, Creating an HTML Help System for Web-Based Products, pp. 227-233, 1998 ACM.*

TechWeb: The Business Technology Network, TechEncyclopedia: JavaScript. http://www.techweb.com/encyclopedia/defineterm?term=javascript, 1981-2001, 2pp.

TechWeb: The Business Technology Networ, TechEncyclopedia: Java, http://techweb.com/encyclopedia/defineterm.yb?term=Java , 1981-2001, 8pp.

* cited by examiner

METHOD AND APPARATUS FOR TRACKING USAGE OF ONLINE HELP SYSTEMS

BACKGROUND OF THE INVENTION

1. Field of the Invention

The present invention relates generally to online help systems, and in particular, to a method, apparatus, and article of manufacture for tracking a user's location and viewing history within an online help system.

2. Description of the Related Art

The proliferation of information technology has provided the opportunity for users of various background and skill levels to use computers and computer programs. To enable diverse users to fully utilize and understand an application, printed manuals are often provided. In addition to printed manuals, interactive electronic help or documentation systems are often available to the user. Such help and documentation systems may be utilized on an individual user's computer through an interactive graphical user interface (referred to as an online help system or other online documentation system).

Document definition languages (DDL) are often used to define the appearance of the information within a help system for display by a Web browser (or other capable application). Since a DDL is a display language defining how a document will be displayed, it is static and distinguishable from a programming language. An example of a DDL is hypertext markup language (HTML). HTML is often utilized to define information within a help system and utilizes a predefined set of "tags" to describe elements to be displayed. Extensible markup language (XML) is another DDL utilized to define elements to be displayed. XML is more flexible than HTML and allows tags to be defined by the developer of the file to be displayed.

Interactive functionality may also be added to HTML and XML pages. Such functionality may be provided by scripting languages. Scripting languages are not compiled into bytecode (similar to other programming languages such as Java™) but remain in source code embedded within an HTML or XML document and must be translated a line at a time into machine code by an interpreter. JavaScript™, LiveScript™, and VBScript™ are examples of scripting languages used to provide such additional functionality to Web pages.

With both HTML and XML elements in the file may be linked to another file or element in another file. Accordingly, a typical HTML or XML based online help system contains many hundreds of HTML/XML files with hundreds of links between the files. The typical HTML/XML based online help system may also consist of statically linked files, with the start and end of the links defined by the author of the online help. Accordingly, help files cannot be customized for/by individual users locally. Help file authors may provide alternate usage paths to aid different kinds of users. However, the user cannot modify such paths dynamically.

To provide such customization in the prior art, proprietary help engines were utilized. Alternatively, the application program that called the online help may be required to track usage of the help, and store the information within the application or in a database. Further, such prior art customization often forces the storage and use of a separate set of help files for each category of potential user. Additionally, to provide such customization, a user may be forced to run a locally installed Web server that accesses server-side include (SSI) files or complex-style sheets for the different types of information.

Accordingly, what is needed is a dynamic customizable help system that does not require a separate or custom application, multiple sets of help files, or a local running Web server.

SUMMARY OF THE INVENTION

One or more embodiments of the invention provide a method, apparatus, and article of manufacture for displaying a customized presentation of one or more help files. Script is added to a help source file that processes cookies. For each help source file opened by a user, the script adds an ID to the cookie that corresponds to the file opened. Thus, the cookie stores the user's current location within a help system. By tracking the user's usage of the help source files, the script can use artificial intelligence to allow the user to customize his or her experience with the help system. Based on the history of the help files used, more or less information may be displayed to a user or particular types of information may be displayed. Further, user-defined preferences may be specified to further customize the help source files presented.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to track a user's location and viewing history within an HTML based online help or documentation system (collectively referred to herein as an online help system) using persistent data in cookies. By keeping track of a user's progress in using the online help system, the help system can allow the user to customize his or her use of the help system and thus view information tailored to his or her needs.

Hardware Environment

Figure 1:
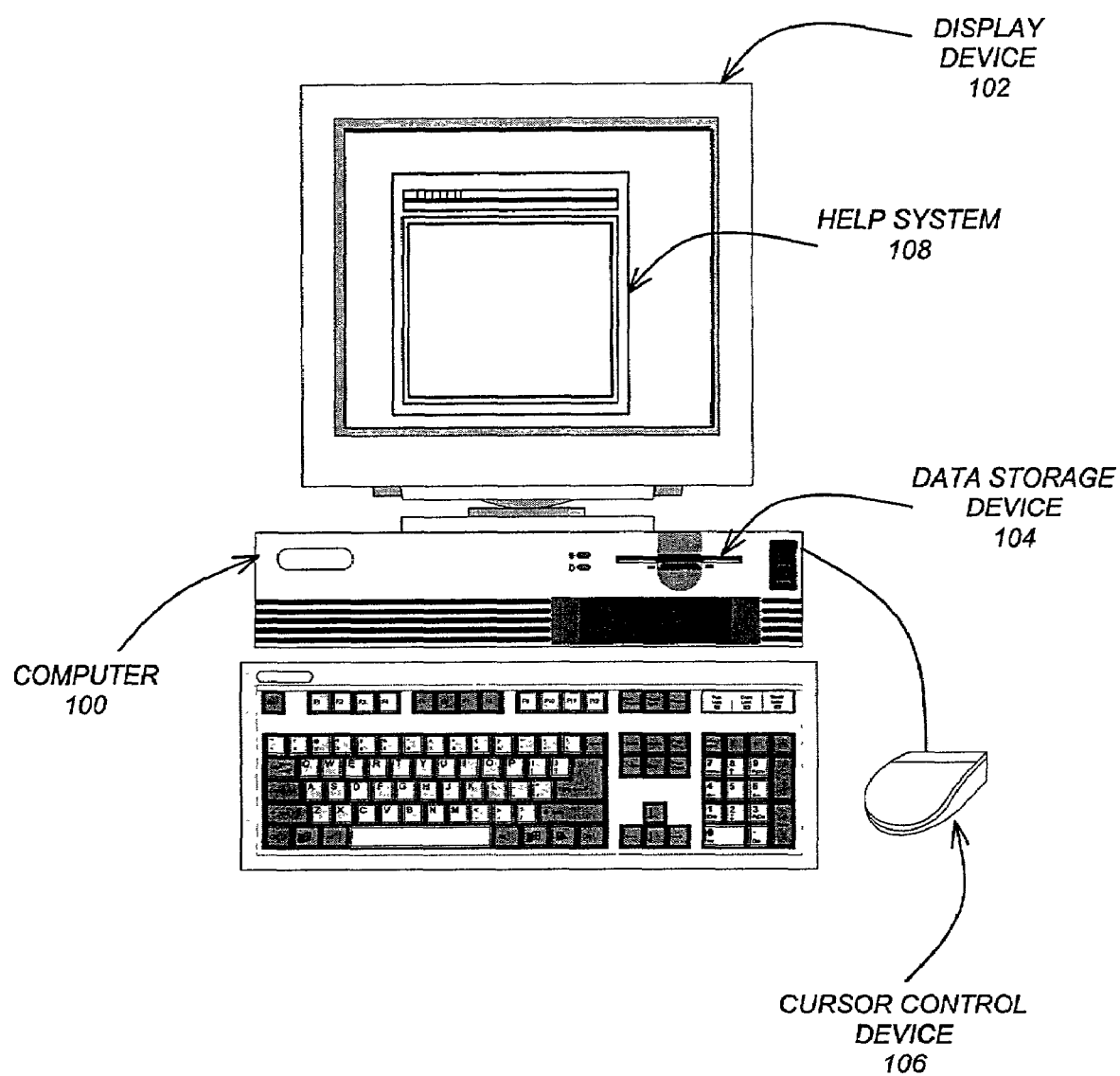
FIG. 1 schematically illustrates a hardware and software environment in accordance with one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented help system 108, wherein the help system 108 is represented by a window displayed on the display device 102. Generally, the help system 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

The help system 108 executing on computer 100 may be viewed using a Web browser executing on computer 100. Thus, the help system 108 may be implemented using HTML or XML interpreted by a Web browser as code written in a scripting language (e.g., Javascrip™, ActiveX components, or other browser-compatible scripting language).

Embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

In accordance with one or more embodiments of the invention, a customized presentation of one or more help source files is provided to a user. Embodiments of the invention provide for the customized presentation within an online help system.

Using a scripting language, code is added to the help source files to process cookies for the help system 108. Cookies are pieces of information traditionally generated and used by a Web server and stored in a client computer, ready for future access. In embodiments of the present invention, cookies may be generated by the script code within the help source file on computer 100.

For each help source file in the help system 108 opened by a user, the script code adds an identification (ID) to the cookie that corresponds to the file opened. Thus, the cookie stores the user's current location within the help system 108. With the addition of timestamp information, the cookie can also maintain a history (referred to as a help history file) of every file in the help system 108 opened by the user. The script may also distinguish between files opened from the graphical user interface (or from outside of the help system 108) and those opened by clicking links within the help system 108.

To enable the customization of the display presented, the author of the help system 108 may have to add meta tags that identify the type of information in each HTML/XML file. The information is probably already known to the author, so the task becomes one of merely adding the meta tags. Thereafter, by tracking the user's usage of the online help, the script code can use artificial intelligence techniques and the author-defined meta-tags in the help source files to allow the user to customize his or her experience with the help system 108.

For example, if a user clicks several links related to a particular topic, the help system 108 could infer the job specialty of the user, and thus hide some of the information (for example, the more basic introductory material) and include some extra information that otherwise might not be visible (for example, advanced techniques or hints and tips). For another user, the help system 108 could infer that he or she is a novice, and thus show only the introductory material, and hide the more advanced information. As a fallback in case the inferences made by the help system 108 should prove incorrect, the user may be able to reset the inferences, thus changing the data in the cookies. Also, all of the information could be available from the index or table of contents for the help system 108.

Figure 2A:
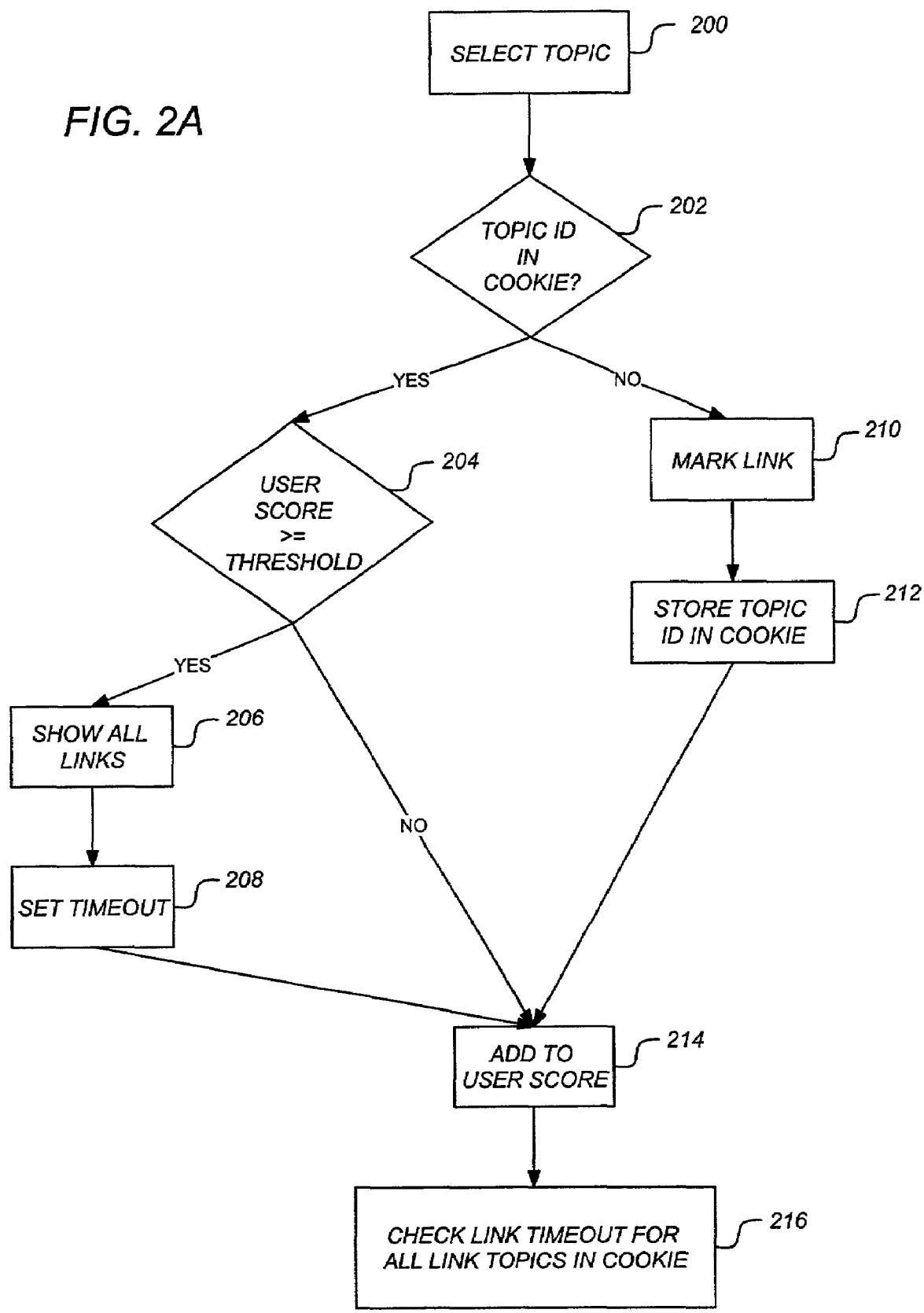
FIGS. 2A and 2B are flow charts illustrating the generation of a customized presentation in accordance with one or more embodiments of the invention.
Figure 2B:
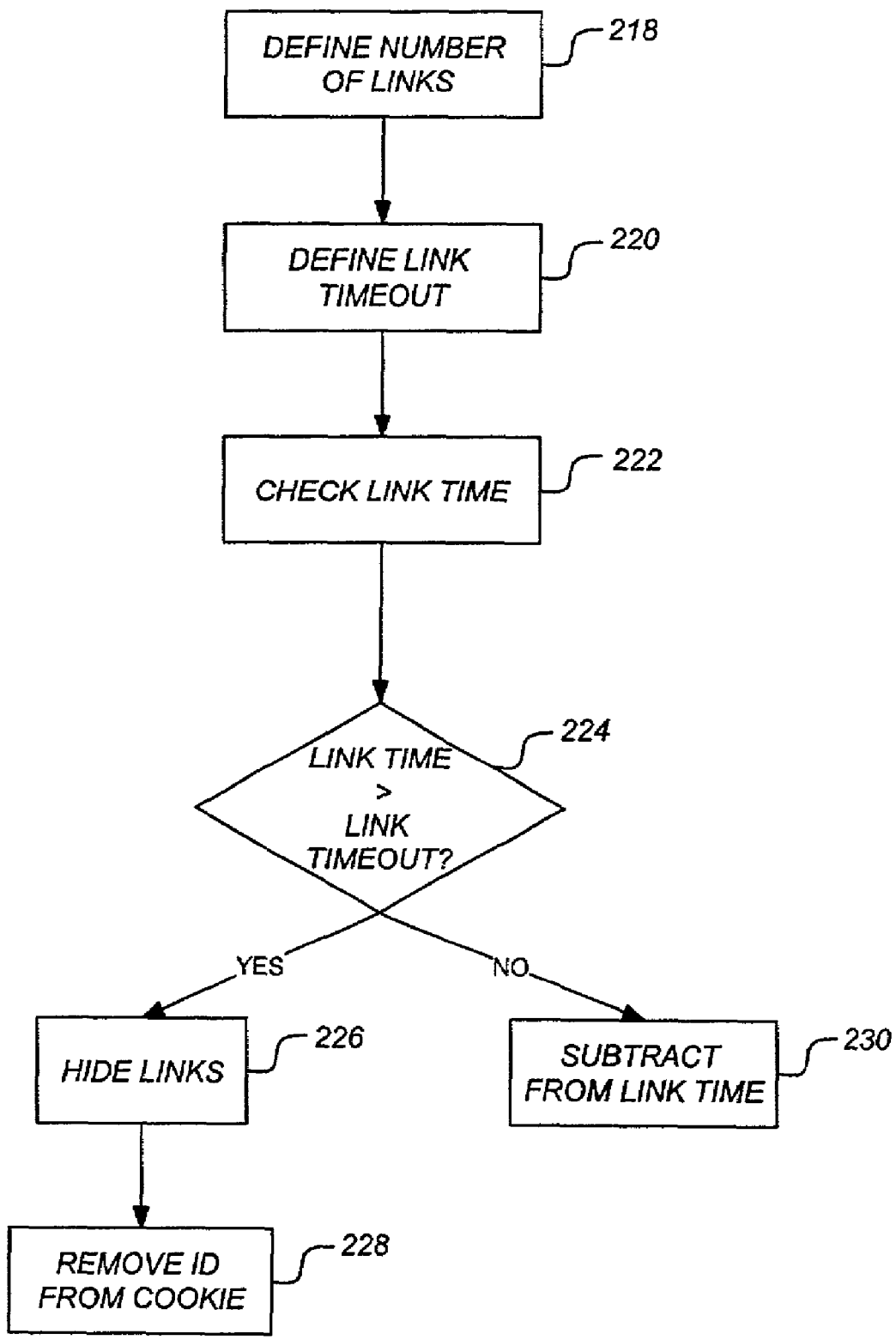

FIGS. 2A and 2B are flow charts illustrating the generation of a customized presentation in accordance with one or more embodiments of the invention. The process is initiated with a user selecting a topic at step 200. At step 202, a determination is made regarding whether a user has selected a topic related to the currently requested topic before. Such a determination may examine the cookie to determine if the topic ID is in the cookie. If the topic was viewed before, a determination is made regarding whether a score for the user is greater than or equal to a predefined threshold level at step 204. Such a determination attempts to evaluate whether the user is experienced or has viewed/selected similar help topics in the past. If the threshold has been reached (i.e., the user has selected multiple related topics in the past), all of the links for the selected topic are displayed at step 206. Thereafter, a timeout value for the link is set a maximum at step 208.

If the topic had not been previously selected (as determined at step 202), the cookie is updated to reflect the current selection. Thus, if the topic was not selected before, the link is marked as seen before at step 210, and the topic ID is stored in the cookie at step 212.

Regardless of the action taken above, since the user has selected the current topic (at step 200), the score for the user (that is used in the evaluation at step 204) is increased or added to at step 214. At step 216, each link topic in the cookie is examined to determine if a timeout has occurred (i.e., whether topics have been selected recently).

FIG. 2B illustrates the timeout procedure performed for each link topic at step 216. Generally, in steps 218–230, a determination is made as to whether a link has been selected within a predefined time period (the link timeout value). If the last time the link was selected exceeds the predefined time period (the link timeout value), most of the links for the topic are hidden and the link is marked as not having been selected recently. However, if the last time the link was selected is not greater than the link timeout period, then the links for the topic remain displayed and time is subtracted from the link (due to the selection of the link at step 200).

Accordingly, at step 218, the default value for the number of links to show for all topics is defined. At step 220, the default value for the link timeout is defined (i.e., a time limit after which the link is identified as not having been selected). At step 222, the currently selected link's time is determined (i.e., the last time this link was selected). The link time is compared to the link timeout at step 224. If the link time is greater than the link timeout value (i.e., the link has not been selected for a certain period of time), all of the links but the topmost links are hidden for the link topic at step 226. At step 228, the topic ID is then removed from the cookie (i.e., as having not been selected before). However, if the link time is less than the link timeout (i.e., the link was selected recently), the link time is further reduced/subtracted from at step 230.

Figure 3A:
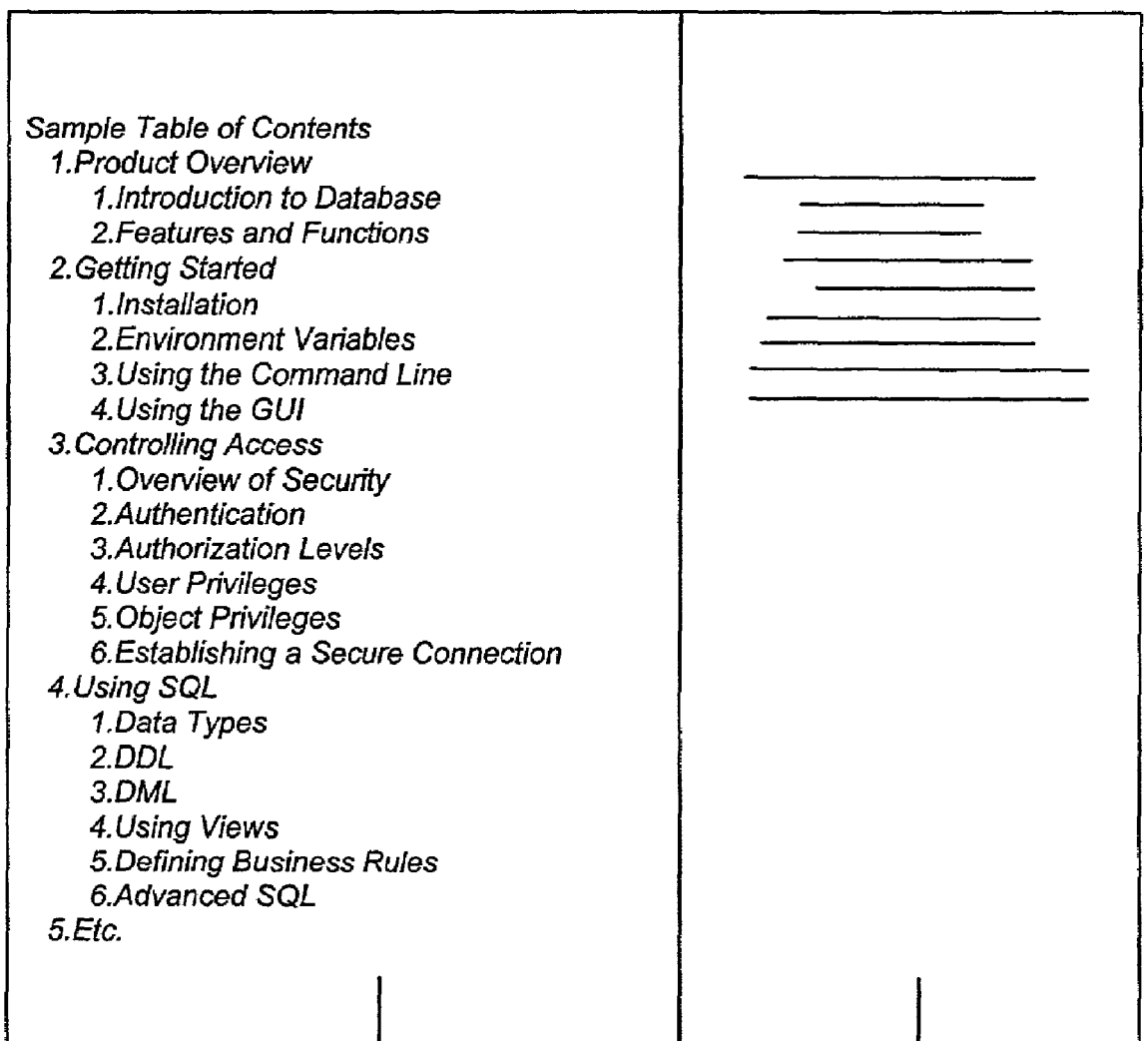
FIGS. 3A–3D illustrate a Table of Contents displayed in accordance with one or more embodiments of the invention.

FIGS. 3A–3D illustrate a Table of Contents (perhaps as the left-hand frame 302 of a multi-framed layout, or as a separate Table of Contents window) as suggested in FIGS. 2A–2B in accordance with one or more embodiments of the invention. Frames 302 and 304 comprise two frames of a multi-frame layout with the Table of Contents displayed in the left-hand frame 302 and additional detailed content displayed in the right-hand frame 304. FIG. 3A illustrates a fully expanded table of contents in the left-hand frame 302 of a multi-framed layout.

In one scenario, the user is a database administrator (DBA), already knows the product, and does not write much structured query language (SQL). Initially, the presentation of the Table of Contents may be displayed as illustrated in FIG. 3B with just the headers displayed in the left hand frame 302 of a multicolumn display.

Additionally, the links (1–5) may all have their link time as the default value (perhaps equal to zero). The user enters the help system 108 looking for security information. After clicking several links related to security (or performing a search on the topic), the user score for this topic exceeds the threshold (at step 204), and the presentation of the Table of Contents may be customized to display as illustrated in FIG. 3C with the controlling access and security related area of the Table of Contents fully expanded.

Figure 3B:
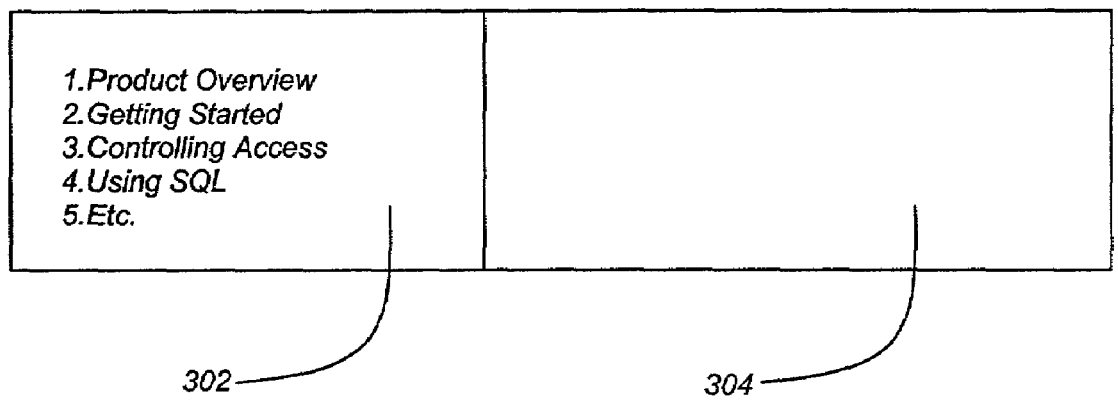
Figure 3C:
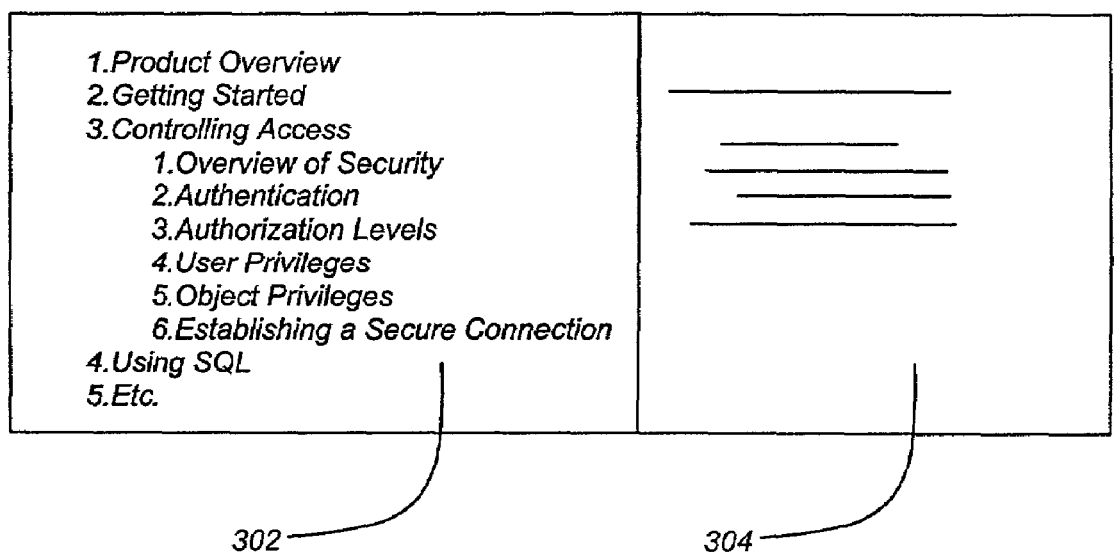
Figure 3D:
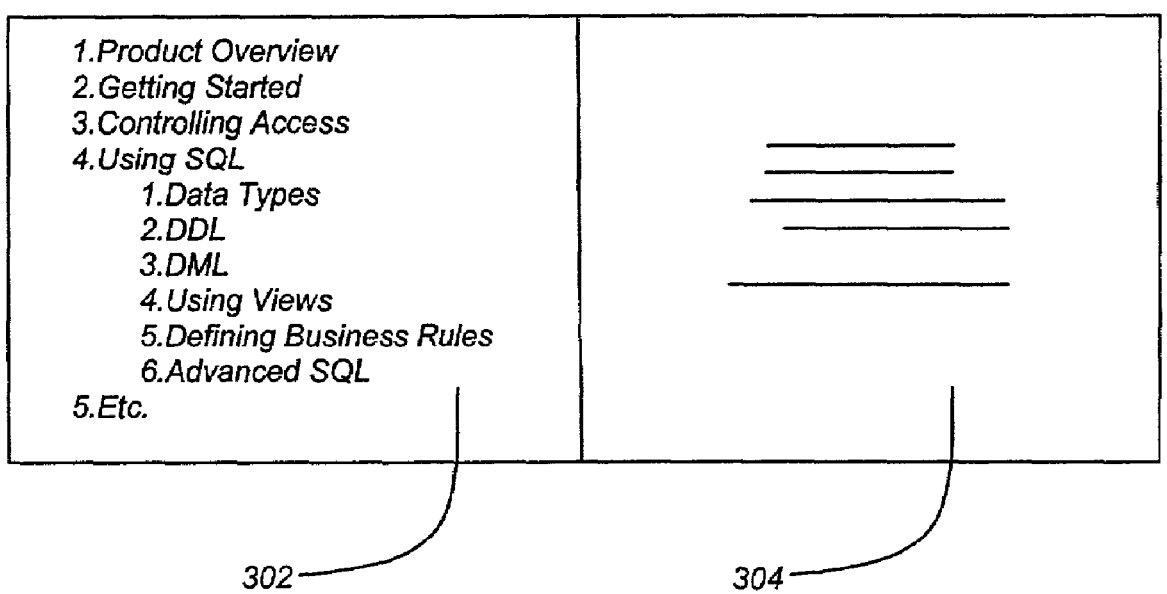

In a second scenario, the user is a novice user and, as before, the presentation of the Table of Contents may initially appear as illustrated in FIG. 3B. Also, all links (1–5) have their link time as the default, perhaps equal to zero. The user enters the help system 108 looking for basic information about SQL. After clicking several links related to SQL (or performing a search on the topic), the user score for this topic exceeds the threshold, and the presentation of the Table of Contents may be customized and expand to appear as illustrated in FIG. 3D with the SQL portions of the Table of Contents expanded.

If the user desires to know more about the product itself, the user may poke around in the help system 108 for a long period of time without returning to any of the SQL topics. At this point, when the link timeout is exceeded for the SQL topics, the Table of Contents would collapse to hide all of the SQL links from the Table of Contents. The Table of Contents would, however, have expanded to show whatever the user was reading instead of the SQL topics.

Thus, links that are current (i.e., the user has clicked on the topic or a related topic recently, where "recent" is defined by the specific implementation) remain visible and easily accessible. Links that the user has not clicked on recently are hidden.

The above scenarios illustrate only a Table of Contents. However, the preferred implementation could also expand or collapse lists of "Related Information" links at the bottom of each help topic (e.g., HTML page), so that only those topics that are related to what the user has been reading recently are displayed. A setting for the entire help system 108 may allow the user to disable such tracking so that all links are always visible (i.e., none are hidden).

One key element to enable the help system 108 to recognize "related" links is to add some metadata to each link. As part of a link, a query string can be included, for example:

<a target="_blank"
   href="authentication.html?topic=security">Authentication</a>

The information following the question mark in the link (the "href") is the query string. The file "authentication.html" could have some script to parse the query string, for example:

//get the arguments passed by the calling page, minus the question mark var argstr=location.search.substring(1, location.search.length);
//parse the args, assuming ampersands between them var args=argstr.split('&');

In the above example, each element of the args array contains one part of the query string. Accordingly, there is only one part: "topic=security". The script can then further parse the query string to get the specific topic. Note that any given link could be assigned multiple topics, to give greater flexibility to the overall tracking of usage of the help system 108.

Thus, by adding a query string to each link in the help system 108 that represents the topic metadata, the help system 108 can use that information to track which links the user has clicked "recently", store the topics in a cookie to maintain the state (even across shutdown of the browser 108), and control what kinds of links the help system 108 displays to each user.

Another possible implementation would be to allow the user to specify his or her areas of interest, and have the help system 108 only display topics related to the specified areas of interest. In this implementation, the help system 108 would not dynamically track links and hide or show them, but would only hide or show links when the user specifies a new area of interest. Certain implementations could combine both techniques.

Figure 4:
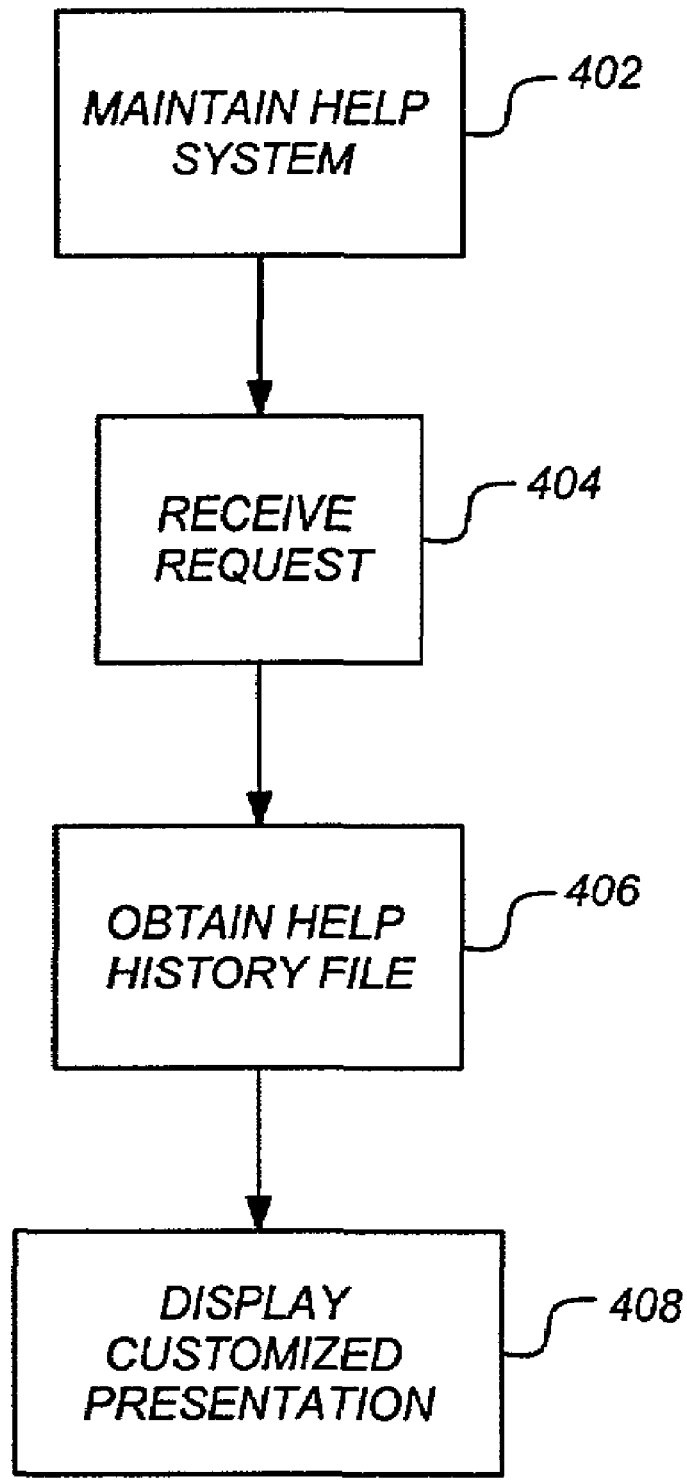
FIG. 4 is a flow chart illustrating a general methodology of the invention in accordance with one or more embodiments.

FIG. 4 is a flow chart illustrating a general methodology of the invention in accordance with one or more embodiments. At step 402, a help/documentation system 108 is maintained that is comprised of a single set of one or more help source files (a help source file as used herein includes source files for both online help systems and online documentation systems). At step 404, a request to present a help source file is received. At step 406, a help history file is obtained in response to the request. As described above, the help history file stores information relating to a usage of the help system 108. At step 408, a customized presentation of the help source file based on the information stored in the help history file is displayed. The customized presentation displayed at step 408 may display a modified amount of material from within the help source files (i.e., based on an experience level of a user indicated by the help history file or a type of material within the help source files).

As described above, the customized presentation may be provided by computer program code such as a scripting language that in addition to customizing the display based on the help history file may be able to distinguish between help source files opened from within the help system 108 and those opened from outside of the help system 108. Further, the help source files may be stored in a tagged meta language representation such as HTML or XML and the help history file may comprise a cookie. Additionally, the help history file may comprise a history of every help source file in the help system 108 opened by a user, and/or the user's current location within the help system 108.

Many advantages over the prior art are provided by the invention. For example, by using a script on the computer 100 to process the cookies and help source files, the user does not need to have a locally installed Web server running. Instead, the script can use the information in the cookies and the meta tags to dynamically show information to the user, thus imitating the function of server-side include (SSI) files typically processed by a Web server. This dynamic processing of files also allows the author to maintain a single set of source files, rather than separate sets for each category of potential user.

Accordingly, authors may provide alternate usage paths that users can dynamically modify. The information is then stored within the help system 108 itself. Additionally, by using script executing on the computer 100, instead of common gateway interface (CGI) scripts or Java™ servlets, the invention removes the need for a Web server, that might otherwise be required to implement dynamic user customization of a help system 108. Further, applets are not appropriate because they cannot maintain state without writing to a cookie file, and in this case a script is still required. Advanced artificial intelligent like functions, however, could be provided by an applet that interacts with the script.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for presenting a help source file comprising:
   (a) maintaining, on a local computer, a help system comprised of a single set of one or more help source files;
   (b) receiving, on the local computer, a request to present a help source file;
   (c) obtaining, from the local computer, a help history file in response to the request, wherein:
      (i) the help history file stores information relating to a usage of the help system; and
      (ii) the help history file comprises a cookie, generated by the local computer, wherein an identification for each previously opened help file is stored in the cookie;
   (d) displaying, on the local computer, a customized presentation of the help source file based on the information stored in the help history file.

2. The method of claim 1 wherein computer program code stored within the help source file is configured to display the customized presentation of the help source file based on the information stored in the help history file.

3. The method of claim 2 wherein the computer program code is written in a scripting language.

4. The method of claim 2 wherein the computer program code is configured to distinguish between help source files opened from within the help system and those opened from outside of the help system.

5. The method of claim 1 wherein the one or more help source files are stored in a tagged meta language representation.

6. The method of claim 5 wherein the tagged meta language representation comprises hypertext markup language (HTML).

7. The method of claim 5 wherein the tagged meta language representation comprises extensible markup language (XML).

8. The method of claim 1 wherein the cookie is generated locally by a client computer.

9. The method of claim 1 wherein the information stored in the help history file comprises a history of every help source file in the help system opened by a user within a specified time interval.

10. The method of claim 1 wherein the information stored in the help history file comprises a user's current location within the help system.

11. The method of claim 1 wherein the customized presentation provides for modifying an amount of material from within the help source files that is displayed.

12. The method of claim 11 wherein the amount of information displayed is based on an experience level of a user indicated by the help history file.

13. The method of claim 1 wherein the presentation is customized based on a type of material within the help source files.

14. A computer-implemented help system for presenting a help file, comprising:
   (a) a local computer having a display device attached thereto;
   (b) means, performed by the local computer, for maintaining a help system comprised of a single set of one or more help source files;
   (c) means, performed by the local computer, for receiving a request to present a help source file;
   (d) means, performed by the local computer, for obtaining a help history file, from the local computer, in response to the request, wherein:
      (i) the help history file stores information relating to a usage of the help system; and
      (ii) the help history file comprises a cookie generated by the local computer, wherein an identification for each previously opened help file is stored in the cookie;
   (e) means, performed by the local computer, for displaying a customized presentation of the help source file based on the information stored in the help history file.

15. The system of claim 14 wherein the means for displaying a customized presentation of the help source file comprises computer program code stored within the help source file.

16. The system of claim 15 wherein the computer program code is written in a scripting language.

17. The system of claim 15 wherein the computer program code is configured to distinguish between help source files opened from within the help system and those opened from outside of the help system.

18. The system of claim 14 wherein the one or more help source files are stored in a tagged meta language representation.

19. The system of claim 18 wherein the tagged meta language representation comprises hypertext markup language (HTML).

20. The system of claim 18 wherein the tagged meta language representation comprises extensible markup language (XML).

21. The system of claim 14 wherein the cookie is generated locally by the computer.

22. The system of claim 14 wherein the information stored in the help history file comprises a history of every help source file in the help system opened by a user within a specified time interval.

23. The system of claim 14 wherein the information stored in the help history file comprises a user's current location within the help system.

24. The system of claim 14 wherein the customized presentation provides for modifying an amount of material from within the help source files that is displayed.

25. The system of claim 24 wherein the amount of information displayed is based on an experience level of a user indicated by the help history file.

26. The system of claim 14 wherein the presentation is customized based on a type of material within the help source files.

27. An article of manufacture embodying logic for performing a method for presenting a help source file on a display device connected to a local computer, the method comprising:
   (a) maintaining, on the local computer, a help system comprised of a single set of one or more help source files;
   (b) receiving, on the local computer, a request to present a help source file;
   (c) obtaining, from the local computer, a help history file in response to the request, wherein:
      (i) the help history file stores information relating to a usage of the help system; and
      (ii) the help history file comprises a cookie generated by the local computer, wherein an identification for each previously opened help file is stored in the cookie;
   (d) displaying, on the local computer, a customized presentation of the help source file based on the information stored in the help history file.

28. The article of manufacture of claim 27 wherein computer program code stored within the help source file is configured to display the customized presentation of the help source file based on the information stored in the help history file.

29. The article of manufacture of claim 28 wherein the computer program code is written in a scripting language.

30. The article of manufacture of claim 28 wherein the computer program code is configured to distinguish between help source files opened from within the help system and those opened from outside of the help system.

31. The article of manufacture of claim 27 wherein the one or more help source files are stored in a tagged meta language representation.

32. The article of manufacture of claim 31 wherein the tagged meta language representation comprises hypertext markup language (HTML).

33. The article of manufacture of claim 31 wherein the tagged meta language representation comprises extensible markup language (XML).

34. The article of manufacture of claim 27 wherein the cookie is generated locally by a client computer.

35. The article of manufacture of claim 27 wherein the information stored in the help history file comprises a history of every help source file in the help system opened by a user within a specified time interval.

36. The article of manufacture of claim 27 wherein the information stored in the help history file comprises a user's current location within the help system.

37. The article of manufacture of claim 27 wherein the customized presentation provides for modifying an amount of material from within the help source files that is displayed.

38. The article of manufacture of claim 37 wherein the amount of information displayed is based on an experience level of a user indicated by the help history file.

39. The article of manufacture of claim 27 wherein the presentation is customized based on a type of material within the help source files.

* * * * *